United States Patent [19]

Finger

[11] 4,013,432
[45] Mar. 22, 1977

[54] BLOWER AND DUCT ARRANGEMENT FOR AIR FILTERING SYSTEM
[75] Inventor: Richard H. Finger, Hollywood, Fla.
[73] Assignee: Klykon, Inc., Miami, Fla.
[22] Filed: Apr. 21, 1975
[21] Appl. No.: 569,817
[52] U.S. Cl. .............................................. 55/467
[51] Int. Cl.² ....................................... B01D 46/10
[58] Field of Search ............ 55/467, 469, 472, 470, 55/471, 473; 417/360

[56] References Cited
UNITED STATES PATENTS

| | | | |
|---|---|---|---|
| 1,937,483 | 11/1933 | Shurtleff | 55/467 X |
| 2,065,970 | 12/1936 | Hartzell | 55/473 |
| 2,337,325 | 12/1943 | Hach et al. | 55/467 X |
| 2,825,500 | 3/1958 | McLean | 55/467 X |
| 3,165,625 | 1/1965 | Potter | 219/369 |
| 3,251,540 | 5/1966 | Kinsworthy | 55/467 X |
| 3,496,704 | 2/1970 | Bandlow | 55/473 X |

*Primary Examiner*—Frank W. Lutter
*Assistant Examiner*—David L. Lacey
*Attorney, Agent, or Firm*—Jackson & Jones Law Corporation

[57] ABSTRACT

A blower is mounted in an enclosure; having a first opening covered by a filter media and a second opening; in such a way that the rotating axis of its blower wheel, or rotor, is: (a) located at or near the vertical midway point between the top and bottom of the enclosure, or duct, in which the blower is mounted, and (b) angularly displaced from the usual horizontal orientation (i.e., horizontal axis of rotation of the blower) by a substantial angle, preferably 15° to 75°.

6 Claims, 10 Drawing Figures

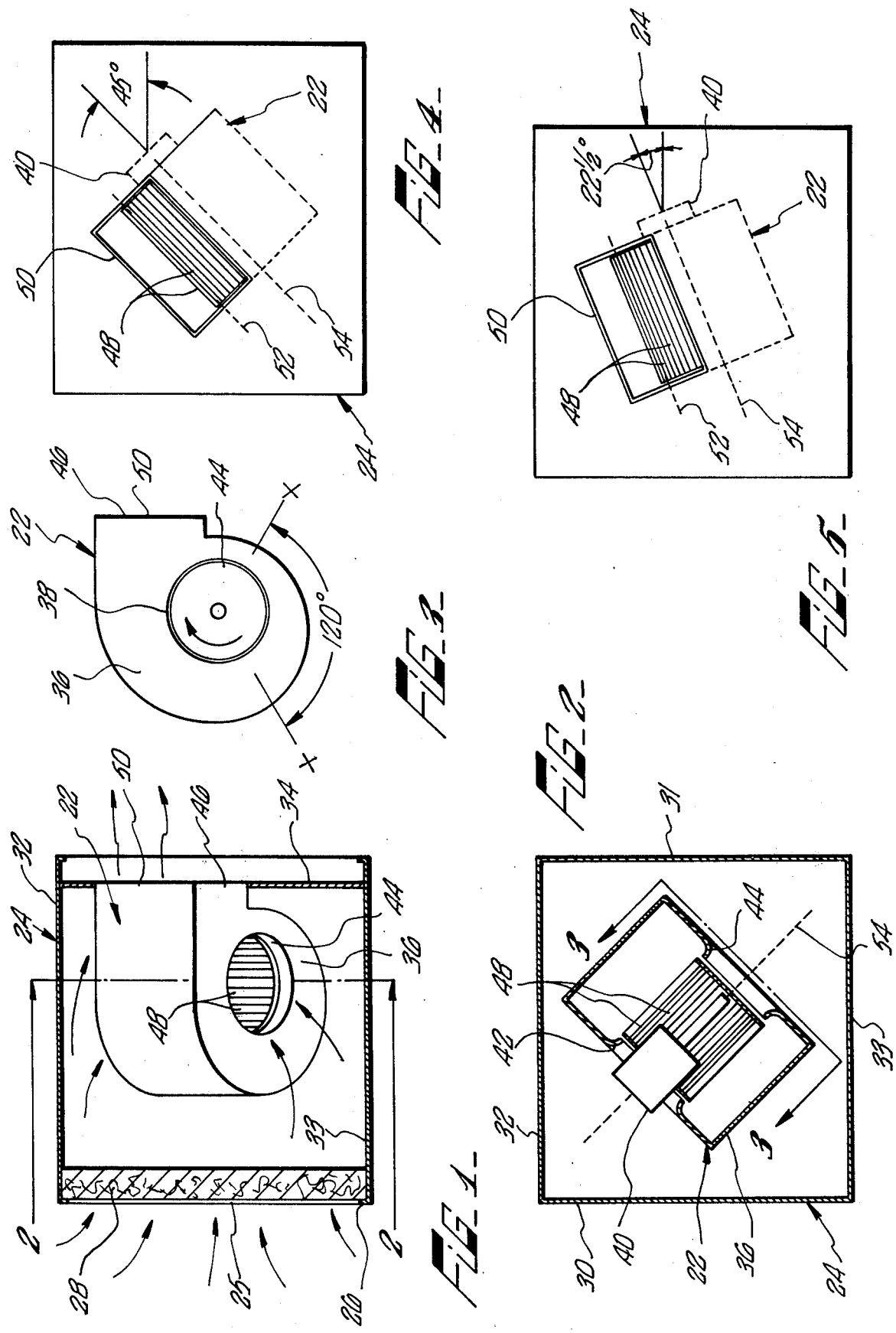

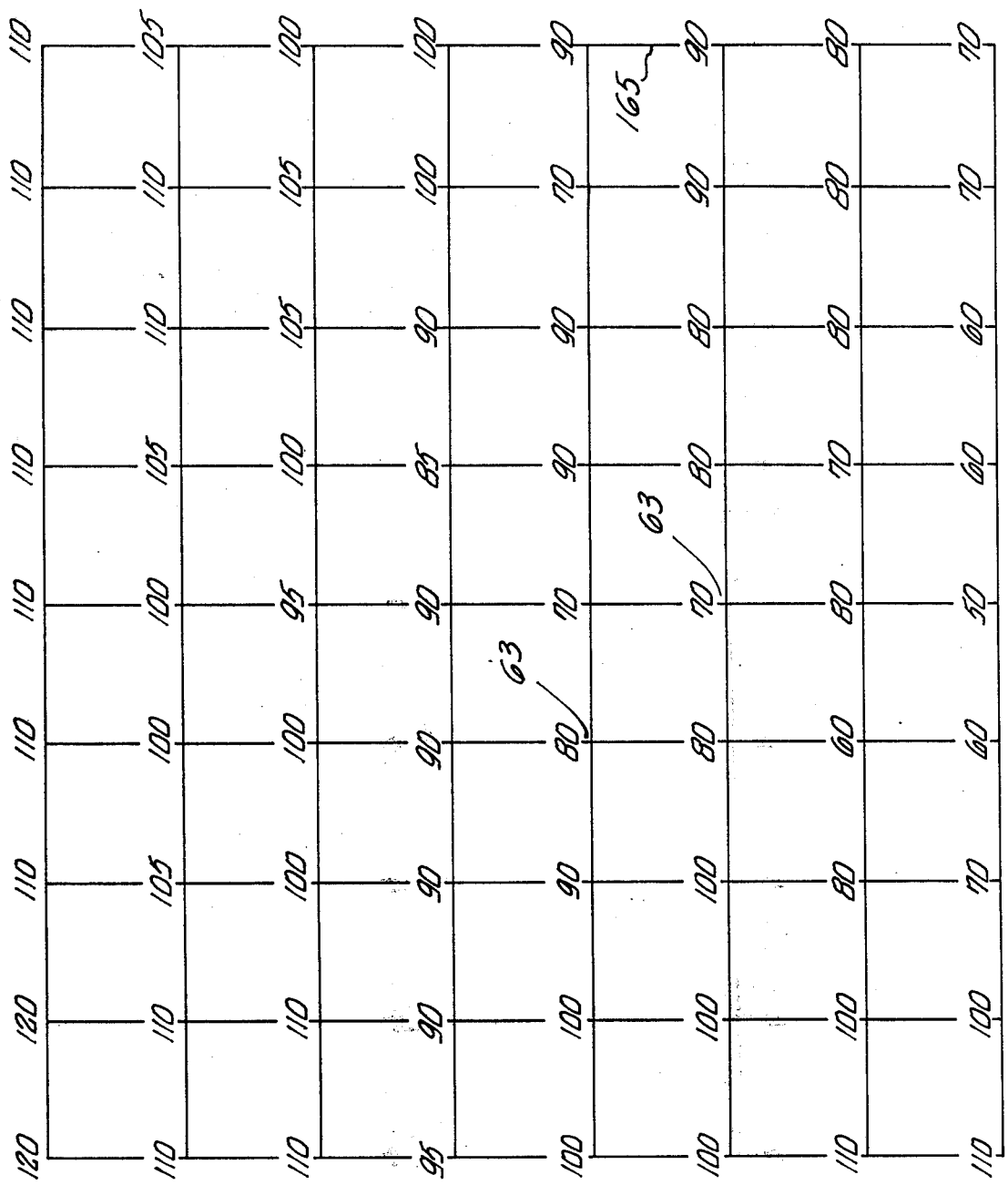
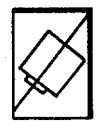
45°
FIG_8_

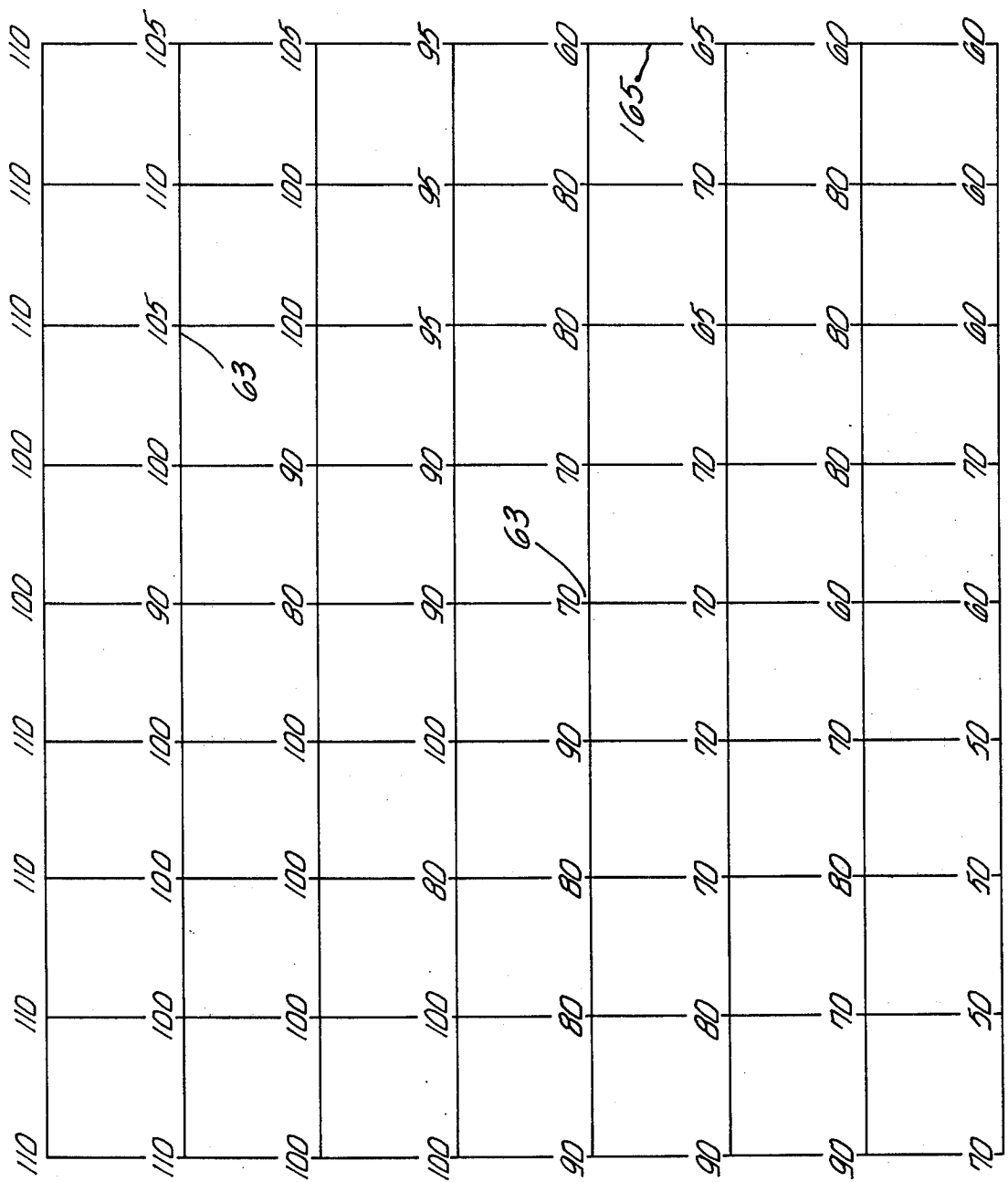

BLOWER AND DUCT ARRANGEMENT FOR AIR FILTERING SYSTEM

BACKGROUND OF THE INVENTION

Blowers are used extensively in furnaces, air conditioners, and other appliances. One of the uses of particular interest here relates to the filtering or purification of air. Such blowers for air purification are usually enclosed in cabinets into which air is drawn through a front opening in the cabinet, passed through an electrostatic air cleaning and filtering system, and then discharged from the blower through an exit louver or grille. Customarily the blower is so located that the axis of rotation of the blower wheel, or rotor, extends along a horizontal axis. Air is drawn in at each end of the blower wheel and forced out centrifugally by blades, or vanes, mounted on the periphery of the blower wheel. The air drawn in by rotation of the blower wheel is discharged through a scroll-shaped, or spirally-enlarging, passage which ends at the discharge face of the blower housing.

SUMMARY OF THE INVENTION

I have discovered that significant advantages in blower efficiency and uniformity of flow in the upstream duct can be obtained by the following relatively simple change from the customary, and apparently universal, blower mounting practice: tilting the axis of the blower wheel away from the usual horizontal position so that it extends on a line making a substantial angle with the horizontal.

This change provides results which are both significant and surprising. There is no evidence that this concept has been tried before in the air-filtering art.

For best results, it is preferable to mount the blower unit near the geometric center of the duct.

The present concept applies to a blower mounted in an enclosure in which the inlet and discharge openings are at opposite sides of the enclosure, such as the rear and front. References to the relative location of the blower wheel axis are intended to relate primarily to the dimensions of the inlet opening in the enclosure, i.e. the area covered by the filtering unit. It is, of course, desired to pull the maximum amount of air through the filter and to provide as uniform a flow pattern as possible.

BRIEF DESCRIPTION OF THE DRAWINGS:

FIG. 1 is a side elevation, partially in section, showing a blower unit mounted in an enclosure in such a way as to obtain the improved performance resulting from this invention;

FIG. 2 is a cross-sectional view taken on the line 2—2 of FIG. 1;

FIG. 3 is a cross-sectional view taken on the line 3—3 of FIG. 2;

FIG. 4 is a front elevation showing the orientation of the blower unit in the enclosure with its axis on a 45° angle;

FIG. 5 is a front elevation showing a modification in which the blower unit in the enclosure has its axis on a 22½° angle;

FIGS. 6 through 10 are diagrams of air movement readings for locations of the blower wheel axis of rotation at angles with the horizontal of 0°, 22½°, 45°, 67½°, and 90° respectively.

DETAILED DESCRIPTION OF THE PREFERRED EMBODIMENTS

Figure 6:
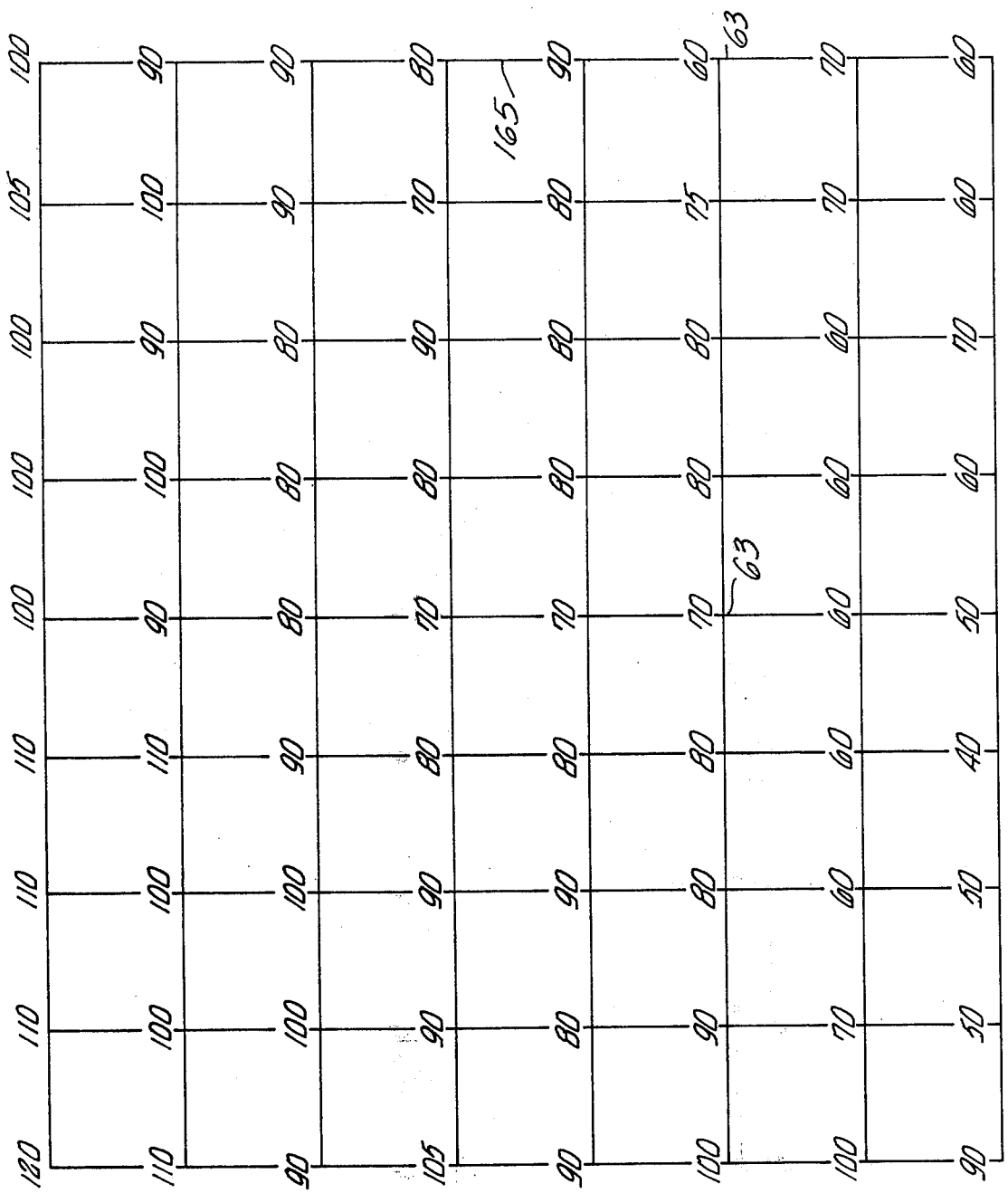

As shown in FIGS. 1 through 3, the basic structural elements of this invention are standard in the art relating to forced air flow. Furthermore, the changes I have made are relatively simple changes in the orientation of those structural elements.

However, these changes lead to significant, and even dramatic, changes in blower efficiency, which are particularly unexpected in view of the long term, widely accepted, normal commercial practice followed in orienting blowers relative to their enclosures.

My primary interest is in the efficient filtering of air for rooms, particularly those used by substantial numbers of people. However, the improved air flow characteristics of my invention are equally applicable to any other situation where large-scale, well-distributed air flow is desired.

Traditionally, and apparently universally, the practice in the blower art has been to so mount the blower and its motor in the cabinet enclosure, or duct, so that the axis of rotation of the cylindrical rotor is on a horizontal, or in some fewer instances on a vertical, line.

As shown in the drawings, I tilt the blower unit 22 in mounting it in the enclosure 24, so that the axis of rotation of its rotor is on a line which makes a substantial angle with the horizontal of the enclosure. This simple change from standard practice has produced very significant air flow improvements both in:
 a. increased volume of air flow through the unit (maximum air flow for constant blower input power); and
 b. even distribution of air flow around the area of the air cleaning, or filtering, media mounted in the inlet (i.e., most uniform velocity distribution in the duct).

The blower unit 22 is shown in FIGS. 1 through 3 mounted at a 45° angle with the horizontal of the enclosure, an angle which produces excellent results. The enclosure, or duct, 24 has its inlet opening 25 through its rear portion 26, which is at the left in FIG. 1. A filtering, or air purification, unit 28 is mounted inside the enclosure to cover the inlet opening. The sides of the enclosure are provided by sidewalls 30 and 31 and have no openings therein. The top 32 and bottom 33 of the enclosure also have no openings therein.

The blower unit 22 is mounted on the front wall 34 of the enclosure. The basic elements of the blower unit, which may be a standard commercially available unit, are its housing 36, a blower wheel 38 inside the housing, and a motor 40 mounted on one side of the blower housing and operatively connected to the blower wheel 38. Other variations of this basic configuration exist, including single-motor and dual-blower units; however, the basic concept defined herein remains constant.

The rotor 38, when turned by the motor 40, draws air in at each end through openings 42 and 44 in the blower housing, and centrifugally discharges the air through the passage 46 in the blower housing. The periphery of the rotor has a series of curved, axially-extending blades, or vanes, 48 which force the air through the somewhat scroll-shaped, or spirally-enlarging, passage 46 in the blower housing, and discharge it into the room through opening 50 in the front wall 34 of the enclosure.

The discharge opening 50, as viewed from the front of the enclosure, is normally rectangular as shown, or square. However, its particular shape is not vital; and various shapes, such as circular, or oval, could be used without changing the beneficial results derived from my invention.

As will be discussed further below, it appears that the improved results do not occur if the discharge opening 50 is located lower than the center of the rotor. In other words, based on my experimental results thus far, I must assume that the benefits occur when the tilting of the blower unit does not bring the longitudinal center line 52 of the discharge opening 50 as low as, or lower than, the axis of rotation 54 of the rotor 38.

FIGS. 4 and 5 are views looking at the front of the enclosure 24, and showing the blower unit mounted at different angles, both of which have been demonstrated to give excellent results.

In FIG. 4, the blower unit 22 has its rotor's axis of rotation on an angle of 45° with the horizontal.

In FIG. 5, the blower unit 22 has its rotor's axis of rotation on an angle of 22½° with the horizontal.

The enclosure 24, as seen in FIGS. 4 and 5, has a somewhat rectangular, or oblong, shape, i.e. its width is somewhat greater than its height. This dimensional relationship, in actual installations, may vary widely. The enclosure may be square, or its height may exceed its width. Also, its sides may not always be at right angles. It is believed the ideal angle of tilt for the blower unit may depend to some extent on the cross-sectional dimensions of the enclosure.

I have found that the best results are obtained when the center of the blower wheel, or rotor, is located at or near the geometrical center of the duct, or enclosure. Although the reasons for the surprising benefits gained from the use of my invention are not entirely clear, I have theorized that the different orientation of the blower unit in the enclosure improves the "breathing" characteristics of the blower, i.e., makes for better flow of air through the filtering unit 28 and into the inlet openings 42 and 44 of the rotor 38.

FIGS. 6 through 10 are diagrams setting forth air movement readings which show the results of comparative tests involving various orientations of the rotor axis in the enclosure. The numbers shown in FIGS. 6 through 10 are the feet per minute measurements of air velocity at each reference point 63 on the face 165 of the filter unit 28 (FIG. 1) where the respective numbers are shown on the diagram.

Figure 7:
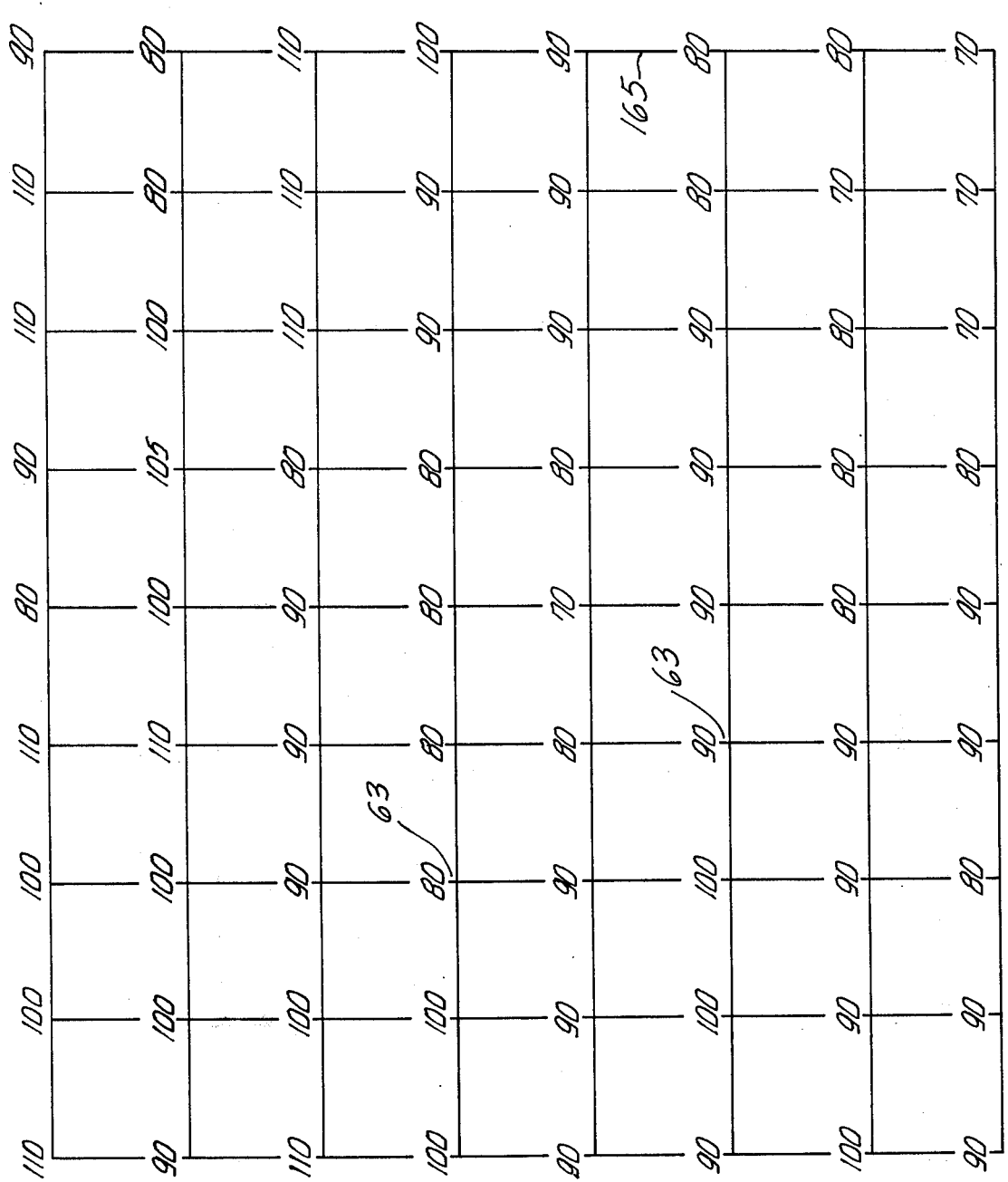
Figure 10:
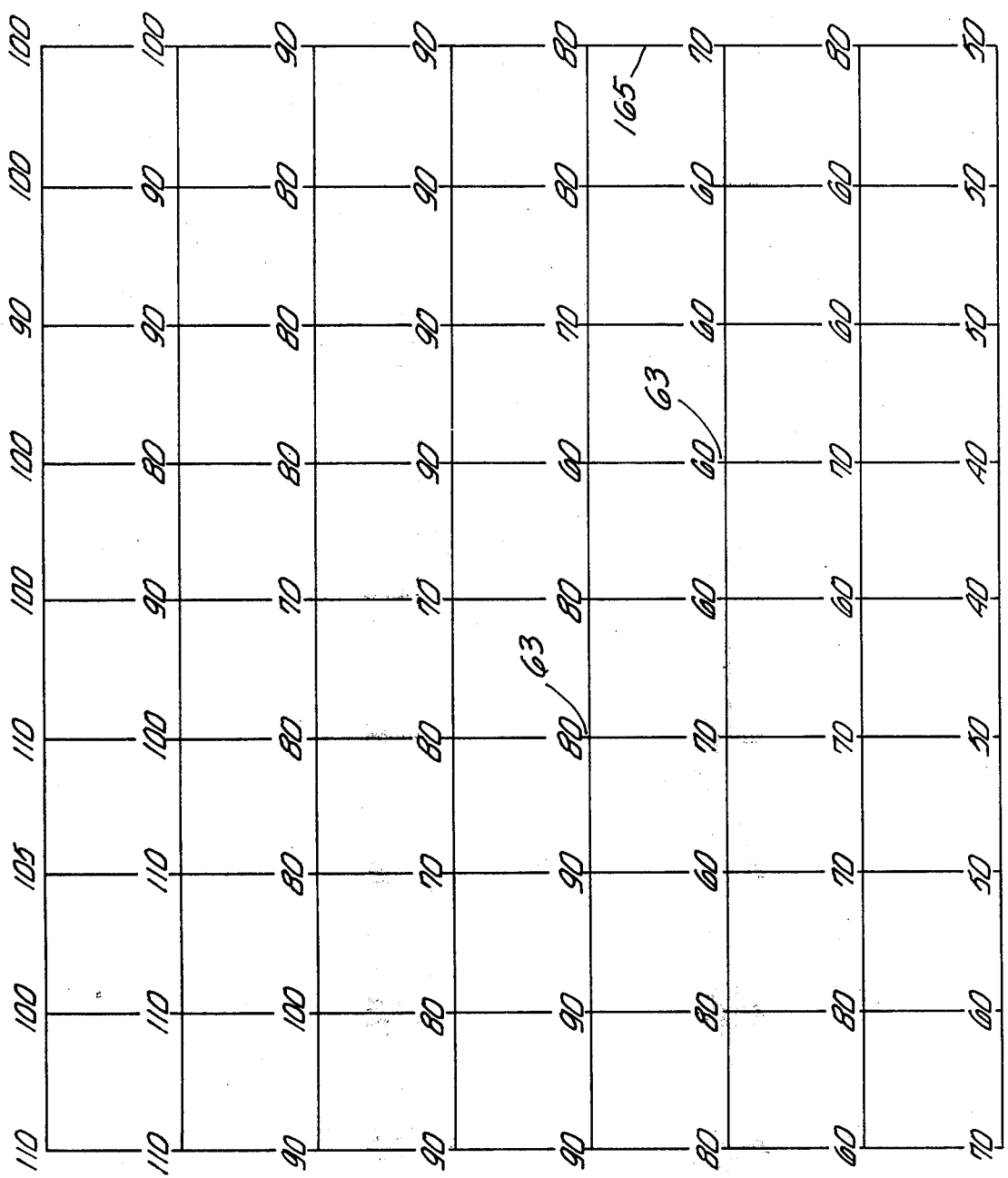

FIG. 6 shows the air movement readings when the axis of rotation of the rotor is horizontal. FIG. 7 shows the air movement readings when the axis of rotation of the rotor makes an angle with the horizontal of 22½°; FIG. 8 shows the readings for an angle of 45°; and FIG. 9 shows the readings for an angle of 67½°. FIG. 10 shows the readings when the axis of rotation is vertical. (The small drawing at the left of each figure shows the angular orientation of the blower during the test which provided the data shown in that figure). In each test all factors were constant except the orientation of the blower unit (and its rotor's axis).

The data shown in FIGS. 6 through 10 should be analyzed primarily with regard to two basic goals: (a) maintaining maximum total airflow for a given blower input power; and (b) maintaining an evenly-distributed airflow.

In calculating the total air velocity and the average air velocity of all the reference points, it is accepted procedure to weigh equally the readings at each reference point. This gives the following results for the 5 test positions:

| Figure No. | Angle | Summation Of All Velocity Of Air Readings At Face Of Filter In fpm | Average Velocity Of Air At Face Of Filter In fpm |
|---|---|---|---|
| 6 | 0° | 5995 | 83.26 |
| 7 | 22½° | 6525 | 90.62 |
| 8 | 45° | 6690 | 92.91 |
| 9 | 67½° | 6160 | 85.55 |
| 10 | 90° | 5685 | 78.95 |

The foregoing demonstrates that maximum airflow among the tested orientations was at 45°, with 22½° a close second. It is my belief that the reason for the higher airflow at 0° than at 90°, and at 22½° than at 67½°, lies in the rectangular shape of the enclosure, i.e., the fact that its width is somewhat greater than its weight. This means that the "breathing" space at the inlet openings 42 and 44 is more restricted as the axis approaches the vertical than as it approaches the horizontal.

It therefore seems logical that the ideal situation exists when the axis of rotation of the rotor is lying on, or almost on, a diagonal line running between the opposite corners of the enclosure inlet, i.e., looking from either front or rear, either a line from the top left to the bottom right corner, or a line from the top right to the bottom left corner. However, this theory is only speculative at this time; and it is not regarded as essential to my discovery concerning the benefits of a substantial tilting of the rotor axis.

It should be further explained that inferior test results were obtained when the axis was tilted further in the same direction, i.e., moved past the vertical until it again made an angle of 67½° with the horizontal, but with the axis of rotation higher than the discharge opening of the blower. The reason for this is not fully understood at this time. One suggestion which has been advanced is that this result may be related to an observed phenomenon of blower inlet flow. The inlet flow is not evenly distributed around the periphery of each of the blower inlet openings 42 and 44. Over 50% of the inlet flow occurs in an arc of approximately 120° located near the start of the scroll, or spirally expanding discharge passage. This 120° arc is shown at X — X in FIG. 3.

It will be noted that the tilted positions shown in all of the Figures have the motor 40 at the high end of the rotor axis. This is preferred for normal installations because lubrication of the motor is assisted by gravity. However, there is no functional reason why the benefits of my invention could not be obtained if the tilting caused the motor to be at the lower end of the rotor axis.

Comparison and evaluation of the evenness of airflow, i.e., its uniformity of distribution throughout the measurement reference points, has been made by isobaric air velocity analysis of the various test patterns. That analysis leads to the conclusion that the most uniform distribution, in an enclosure having the dimensions of the one used in the tests, occurs at 22½°, with the distribution somewhat less uniform at 45°. The other flow patterns were less uniform.

The desired, or ideal, situation is one in which the airflow is evenly distributed across the area of the filtering unit, and in which the amount of filtered air flowing through the enclosure is maximized.

I have found that the tilted rotor axis permits an efficient air filtration operation with significantly smaller and less powerful blower units than those used in conventional installations. Also, this change in orientation permits use of a more effective filtering unit, having a greater density, and therefore a greater pressure drop across it, than conventional units. In general, the unique blower orientation described in this application provides a significantly higher blower efficiency than prior arrangements.

My tests have indicated that a loss in efficiency results if the tilted blower unit is shifted substantially toward the corner of the enclosure. This indicates that best results should generally be obtained when the center of the rotor axis is located at or near the geometric center of the enclosure, which means, more specifically, the face area of the filtering unit. (Normally the best practice has a filtering unit which covers substantially the full area of the inlet side of the duct, or enclosure, as shown in FIG. 1.)

Although the air flow performance is dramatically improved at angles of 22½° and 45°, it is not feasible to select an angle below which a sharp drop-off occurs in the air flow characteristics. Therefore, it is necessary to make reasonable assumptions in determining the range of orientations which are appropriately covered by the following claims. Obviously, it is not useful to claim very slight angular tilting from the horizontal and vertical, since much better results can be obtained using larger angles of deviation. On the other hand, there is a wide range of angular deviations from standard practice within which very substantial functional improvement occurs.

In the claims, my invention is defined by using either (a) a range of angles of deviation between two specified angle sizes, or (b) a fractional, or ratio, relationship of the angle of deviation to the angle between a horizontal or vertical reference line and an imaginary diagonal line connecting opposite corners of the face area of the filtered inlet opening.

It is recognized that the orientation of the blower with respect to the duct is the significant aspect of the invention, and not necessarily its orientation with respect to the horizontal and the vertical. In other words, if the duct itself is tilted, then the tilting of the blower should be so arranged as to angularly displace its axis from an imaginary line extending across the duct and connecting the centers, or midpoints, of the opposite sides of the duct, i.e., the line which is the axis of symmetry dividing the cross-sectional area of the duct into two equal rectangles. For example, if the duct were tilted 45° from the horizontal, a horizontally extending blower axis of rotation would have the desired 45° tilt with respect to the duct. Accordingly, in the following claims, the terms "horizontal" and "vertical" are to be interpreted as referring to the two axes of symmetry which extend across the center of the area of the duct inlet, i.e., extend between the midpoints of opposite sides of the duct.

What is claimed is:

1. An air flow system of the type in which a centrifugal blower unit having a motor-driven, essentially cylindrical, rotor element and a discharge port is mounted in an enclosure to draw air through a filtering media located at a first opening of said enclosure and discharge the filtered air through a second opening of said enclosure, the improvement therein comprising:

said blower unit located within the enclosure and tilted with respect to the horizontal axis of said enclosure so that the axis of rotation of its rotor element extends along a line which makes an angle with the horizontal axis of said enclosure of between 15° to 75° inclusive, and has its midpoint located at approximately the geometric center of said enclosure.

2. The air flow system of claim 1 wherein said second opening of said enclosure is opposite said first opening of said enclosure.

3. The air flow system of claim 1 wherein the geometrical center of said blower discharge port is located at least as high as the midpoint of the axis of rotation of said rotor element.

4. An air flow system of the type in which a centrifugal blower unit having a motor-driven, essentially cylindrical, rotor element and a discharge port is mounted in an enclosure having sides that meet at 90° angles, to draw air through a filtering media located at a first opening of said enclosure and discharge the filtered air through a second opening of said enclosure, the improvement therein comprising:

said blower unit being located within the enclosure and tilted with respect to the horizontal plane of said enclosure so that the axis of rotation of its rotor element extends along a line which makes an angle greater than 0° and less than 90° with the horizontal plane of said enclosure; and the second opening of said enclosure being located on a side of said enclosure opposite said first opening of said enclosure, the discharge port of said blower being connected to the second opening of said enclosure, and the geometrical center of said discharge port is located at least as high as the geometrical center of the rotor element.

5. The air flow system of claim 4 wherein the midpoint of the axis of rotation of said rotor element is located on a line passing through the geometric center of said first opening and being parallel to the sides of said enclosure.

6. The air flow system of claim 4 wherein the motor of said blower unit is located on the axis of rotation of the rotor element above the horizontal plane of said enclosure.

* * * * *